(12) United States Patent
Yasukochi et al.

(10) Patent No.: US 9,641,732 B2
(45) Date of Patent: May 2, 2017

(54) CAMERA MODULE, ELECTRONIC DEVICE IN WHICH CAMERA MODULE IS MOUNTED, AND METHOD FOR MANUFACTURING CAMERA MODULE

(71) Applicant: SHARP KABUSHIKI KAISHA, Osaka-shi, Osaka (JP)

(72) Inventors: Satoshi Yasukochi, Osaka (JP); Hisateru Okai, Osaka (JP); Hiroshi Yokota, Osaka (JP); Yoshihito Ishizue, Osaka (JP); Yoshihiro Sekimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/407,744

(22) PCT Filed: Apr. 30, 2013

(86) PCT No.: PCT/JP2013/062595
§ 371 (c)(1),
(2) Date: Dec. 12, 2014

(87) PCT Pub. No.: WO2013/190918
PCT Pub. Date: Dec. 27, 2013

(65) Prior Publication Data
US 2015/0172521 A1    Jun. 18, 2015

(30) Foreign Application Priority Data

Jun. 18, 2012  (JP) .................................. 2012-137230
Apr. 30, 2013  (JP) .................................. 2013-094976

(51) Int. Cl.
*H04N 5/225*  (2006.01)
*G02B 7/02*   (2006.01)
*G02B 7/08*   (2006.01)

(52) U.S. Cl.
CPC .......... *H04N 5/2254* (2013.01); *G02B 7/021* (2013.01); *G02B 7/025* (2013.01); *G02B 7/08* (2013.01);
(Continued)

(58) Field of Classification Search
CPC .. H04N 5/2254; H04N 5/2252; H04N 5/2257; G02B 7/025; G02B 7/08; G02B 7/021; Y10T 29/49947
See application file for complete search history.

(56) References Cited

U.S. PATENT DOCUMENTS 5,024,509 A     6/1991  Kurihara
2005/0141106 A1* 6/2005  Lee ..................... G02B 7/023
                                          359/808
(Continued)

FOREIGN PATENT DOCUMENTS

CN    101930105    12/2010
JP    62-153908     7/1987
(Continued)

OTHER PUBLICATIONS

International Search Report for PCT/JP2013/062595 mailed Jun. 4, 2013.
(Continued)

*Primary Examiner* — Albert Cutler
(74) *Attorney, Agent, or Firm* — Nixon & Vanderhye P.C.

(57) ABSTRACT

A plurality of lenses constituting a lens unit (1) are fixed to each other with use of an adhesive (20) applied between the plurality of lenses. The lens unit (1) is incorporated into an actuator (30) through an opening (26) of the actuator (30) and is held inside the actuator (30) so as to face directly an inner wall surface of the actuator (30).

13 Claims, 11 Drawing Sheets

(52) U.S. Cl.
CPC ......... *H04N 5/2252* (2013.01); *H04N 5/2257* (2013.01); *Y10T 29/49947* (2015.01)

(56) References Cited

U.S. PATENT DOCUMENTS

| | | | |
|---|---|---|---|
| 2005/0168846 A1* | 8/2005 | Ye et al. | ........................ 359/819 |
| 2006/0140623 A1* | 6/2006 | Yu | ................................. 396/529 |
| 2006/0228103 A1* | 10/2006 | Go | ..................... G03B 7/09908 |
| | | | 396/268 |
| 2007/0045550 A1* | 3/2007 | Nakajo | ................ G02B 13/005 |
| | | | 250/370.08 |
| 2007/0086769 A1 | 4/2007 | Watanabe et al. | |
| 2007/0242152 A1* | 10/2007 | Chen | ............................. 348/345 |
| 2009/0086342 A1* | 4/2009 | Seki | ....................... G02B 7/028 |
| | | | 359/820 |
| 2009/0174954 A1 | 7/2009 | Hara | |
| 2010/0027135 A1* | 2/2010 | Sodeyama | ............. G02B 7/021 |
| | | | 359/740 |
| 2010/0073534 A1 | 3/2010 | Yano et al. | |
| 2010/0079642 A1* | 4/2010 | Kurimoto et al. | ............ 348/294 |
| 2011/0063739 A1* | 3/2011 | Hirata | .................... G02B 7/021 |
| | | | 359/819 |
| 2011/0096415 A1* | 4/2011 | Lin | ........................ G02B 7/022 |
| | | | 359/793 |
| 2011/0122511 A1 | 5/2011 | Sasaki et al. | |
| 2013/0201559 A1 | 8/2013 | Minamisawa et al. | |

FOREIGN PATENT DOCUMENTS

| | | |
|---|---|---|
| JP | 03-015001 | 1/1991 |
| JP | 2007-121849 | 5/2007 |
| JP | 2008-197282 | 8/2008 |
| JP | 2009-8775 | 1/2009 |
| JP | 2009-103939 | 5/2009 |
| JP | 2009-163120 | 7/2009 |
| JP | 2010-103493 | 5/2010 |
| JP | 2011-107648 | 6/2011 |
| JP | 2011-133702 | 7/2011 |
| JP | 2011-237633 | 11/2011 |
| JP | 2012-008204 | 1/2012 |

OTHER PUBLICATIONS

Written Opinion of the International Searching Authority for PCT/JP2013/062595 mailed Jun. 4, 2013.

* cited by examiner

| 1 : Lens unit | 8 : Upper leaf spring |
| 1a : First lens | 9 : Lower leaf spring |
| 1b : Second lens | 10 : Sensor cover |
| 1c : Third lens | 11 : IRC filter |
| 1d : Fourth lens | 12 : Image pickup device |
| 2 : Lens carrier | 13 : Substrate |
| 3 : Drive coil | 14 : Stopper |
| 4 : Base member | 20 : Adhesive |
| 5 : Upper cover | 25 : Camera module |
| 6 : Magnet | 26 : Opening |
| 7 : Yoke | 30 : Actuator |

| 1: Lens unit | 17: Edge section |
| 1a: First lens | 17a: Upper edge surface |
| 1b: Second lens | 17b: Lower edge surface |
| 1c: Third lens | 18: Edge section |
| 1d: Fourth lens | 18a: Upper edge surface |
| 15: Edge section | 18b: Lower edge surface |
| 15a: Upper edge surface | 19: Light-shielding plate |
| 15b: Lower edge surface | 20: Adhesive |
| 16: Edge section | 21: Spacer |
| 16a: Upper edge surface | |
| 16b: Lower edge surface | |

| 1: Lens unit | 17: Edge section |
| 1a: First lens | 17a: Upper edge surface |
| 1b: Second lens | 17b: Lower edge surface |
| 1c: Third lens | 18: Edge section |
| 1d: Fourth lens | 18a: Upper edge surface |
| 15: Edge section | 18b: Lower edge surface |
| 15a: Upper edge surface | 19: Light-shielding plate |
| 15b: Lower edge surface | 20: Adhesive |
| 16: Edge section | 21: Spacer |
| 16a: Upper edge surface | |
| 16b: Lower edge surface | |

| 1: Lens unit | 17: Edge section |
| 1a: First lens | 17a: Upper edge surface |
| 1b: Second lens | 17b: Lower edge surface |
| 1c: Third lens | 18: Edge section |
| 1d: Fourth lens | 18a: Upper edge surface |
| 15: Edge section | 18b: Lower edge surface |
| 15a: Upper edge surface | 19: Light-shielding plate |
| 15b: Lower edge surface | 20: Adhesive |
| 16: Edge section | 21: Spacer |
| 16a: Upper edge surface | |
| 16b: Lower edge surface | |

| 1: Lens unit | 16a: Upper edge surface |
| 1a: First lens | 16b: Lower edge surface |
| 1b: Second lens | 17: Edge section |
| 1c: Third lens | 17a: Upper edge surface |
| 1d: Fourth lens | 17b: Lower edge surface |
| 2: Lens carrier | 18: Edge section |
| 14: Stopper | 18a: Upper edge surface |
| 15: Edge section | 18b: Lower edge surface |
| 15a: Upper edge surface | 19: Light-shielding plate |
| 15b: Lower edge surface | 20: Adhesive |
| 16: Edge section | 21: Spacer |

| | |
|---|---|
| 1 : Lens unit | 16a : Upper edge surface |
| 1a : First lens | 16b : Lower edge surface |
| 1b : Second lens | 17 : Edge section |
| 1c : Third lens | 17a : Upper edge surface |
| 1d : Fourth lens | 17b : Lower edge surface |
| 2 : Lens carrier | 18 : Edge section |
| 14 : Stopper | 18a : Upper edge surface |
| 15 : Edge section | 18b : Lower edge surface |
| 15a : Upper edge surface | 19 : Light-shielding plate |
| 15b : Lower edge surface | 20 : Adhesive |
| 16 : Edge section | 21 : Spacer |

| 1: Lens unit | 8: Upper leaf spring |
| 1a: First lens | 9: Lower leaf spring |
| 1b: Second lens | 10: Sensor cover |
| 1c: Third lens | 11: IRC filter |
| 1d: Fourth lens | 12: Image pickup device |
| 2: Lens carrier | 13: Substrate |
| 3: Drive coil | 14: Stopper |
| 4: Base member | 20: Adhesive |
| 5: Upper cover | 25: Camera module |
| 6: Magnet | 26: Opening |
| 7: Yoke | 30: Actuator |

| 1: Lens unit | 8: Upper leaf spring |
| 1a: First lens | 9: Lower leaf spring |
| 1b: Second lens | 10: Sensor cover |
| 1c: Third lens | 11: IRC filter |
| 1d: Fourth lens | 12: Image pickup device |
| 2: Lens carrier | 13: Substrate |
| 3: Drive coil | 14: Stopper |
| 4: Base member | 20: Adhesive |
| 5: Upper cover | 25: Camera module |
| 6: Magnet | 26: Opening |
| 7: Yoke | 30: Actuator |

| 1: Lens unit | 10: Sensor cover |
| 1a: First lens | 11: IRC filter |
| 1b: Second lens | 12: Image pickup device |
| 1c: Third lens | 13: Substrate |
| 1d: Fourth lens | 14: Stopper |
| 2: Lens carrier | 20: Adhesive |
| 3: Drive coil | 25': Camera module |
| 4: Base member | 26: Opening |
| 5: Upper cover | 27: Suspension wire |
| 6: Magnet | 28: Camera shake compensation coil |
| 8: Upper leaf spring | 30': Actuator |
| 9: Lower leaf spring | 31: Magnet holder |

1: Lens unit
2: Lens carrier
3: Drive coil
4: Base member
5: Upper cover
6: Magnet
7: Yoke
8: Upper leaf spring
9: Lower leaf spring
14: Stopper
20: Adhesive
22: Jig
23: Stage
26: Opening
30: Actuator 1: Lens unit
2a: Upper lens carrier
2b: Lower lens carrier
3: Drive coil
4: Base member
5: Upper cover
6: Magnet
7: Yoke
8: Upper leaf spring
9: Lower leaf spring
10: Sensor cover
11: IRC filter
12: Image pickup device
13: Substrate
20: Adhesive
24: Stopper section
26: Opening
30: Actuator

CAMERA MODULE, ELECTRONIC DEVICE IN WHICH CAMERA MODULE IS MOUNTED, AND METHOD FOR MANUFACTURING CAMERA MODULE

This application is the U.S. national phase of International Application No. PCT/JP2013/062595 filed 30 Apr. 2013 which designated the U.S. and claims priority to JP 2012-137230 filed 18 Jun. 2012, and JP 2013-094976 filed 30 Apr. 2013, the entire contents of each of which are hereby incorporated by reference.

TECHNICAL FIELD

The present invention relates to a camera module, an electronic device in which the camera module is mounted, and a method for manufacturing the camera module.

BACKGROUND ART

In recent years, a mobile phone in which a camera module is incorporated has become the model which accounts for the majority of the models of mobiles phone used. Such camera modules are required to achieve higher levels of reduction in size and weight as compared with digital cameras, since the camera modules have to be contained within a mobile phone.

Among the camera modules, a type whose automatic focus (AF) function is realized by means of an actuator for driving a lens is in increasing use. The actuator can be classified into various types, for example, a type which uses a stepping motor, a type which uses a piezoelectric element, and a type which uses a VCM (Voice Coil Motor). These types of actuators are already on the market. Similarly, with regard to support means for supporting a lens and movably guiding the lens in a predetermined direction, various methods such as a method of causing a lens to slide along a guide shaft, a method of using the rolling of a ball, and the like have been proposed, although the mainstream method is to use a spring. There has also been proposed a method which uses means that serves both as an actuator and as support means, the means being a shape-memory-alloy wire, for example.

For example, Patent Literature 1 discloses an arrangement which serves both as an actuator and as support means. Specifically, Patent Literature 1 discloses a camera module which is constituted by (i) an actuator which includes (a) a lens barrel containing an optical element and (b) a lens carrier containing the lens barrel, (ii) a solid-state image sensing device, (iii) a substrate, and (iv) the like. The camera module of Patent Literature 1 employs, as a member for holding the optical element, a double structure constituted by the lens barrel and the lens carrier. Accordingly, the camera module is increased in size due to a thickness of the lens barrel.

In view of this, in order to reduce a size of the camera module, Patent Literature 2 proposes, as a structure that can avoid the double structure, a structure which uses no lens barrel. According to an arrangement disclosed in Patent Literature 2, after an image pickup section and a bottom section of an actuator are assembled, lenses are provided on top of the image pickup section and the bottom section assembled, and then adjustment of a distance between the lenses and fixation of the lenses to each other via an adhesive are carried out simultaneously. Subsequently, other members of the actuator are assembled. However, the structure disclosed in Patent Literature 2 has the following problems.

According to the structure disclosed in Patent Literature 2, the lens unit is incorporated while the actuator is being assembled. This may result in a stain or a scratch on a surface of a lens during a step of incorporating the actuator. Further, according to Patent Literature 2, the adjustment of the distance between the lenses of the lens unit and the fixation of the lenses to each other via the adhesive are carried out while the actuator is being assembled. Accordingly, evaluation of the lenses in terms of optical performance is carried out after the actuator is assembled. In this case, a defect of the lenses results in a defect of a whole product including the actuator, so that a cost of defective work is increased. This may cause (i) an increase in defective-product ratio among completed actuators and (ii) a decrease in production efficiency, accordingly.

CITATION LIST

Patent Literature

Patent Literature 1
Japanese Patent Application Publication, Tokukai, No. 2011-237633 A (Publication Date: Nov. 24, 2011)
Patent Literature 2
Japanese Patent Application Publication, Tokukai, No. 2007-121849 A (Publication Date: May 17, 2007)
Patent Literature 3
Japanese Patent Application Publication, Tokukai, No. 2009-8775 A (Publication Date: Jan. 15, 2009)

SUMMARY OF INVENTION

Technical Problem

As described above, according to the structure disclosed in Patent Literature 2, the lens unit is incorporated during the assembly of the actuator, so that a stain or a scratch may be given to a surface of a lens during the step of incorporating the actuator. The stain and the scar cannot be removed by washing after completion of the actuator, so that the optical performance of the lenses is degraded.

Further, according to the structure disclosed in Patent Literature 2, the adjustment of the distance between the lenses of the lens unit and the fixation of the lenses to each other via the adhesive are carried out during the assembly of the actuator. As such, the optical performance of the lenses is evaluated after the assembly of the actuator. In this case, a defect of the lenses results in a defect of the whole product including the actuator. As a result, the cost of defective work is increased. This causes (i) an increase in defective-product ratio among completed camera modules and (ii) a decrease in production efficiency, accordingly.

In view of the above, it is necessary that the lens unit be manufactured before the assembly of the actuator. A method disclosed in Patent Literature 3 is an example of a method that allows a plurality of lenses to be unitized without being held by a lens barrel. Patent Literature 3 discloses a method in which a first lens and a second lens are fixed to each other by applying an adhesive in a state where an outer circumferential surface of the first lens and an outer circumferential surface of the second lens face each other.

However, according to the method of bonding as disclosed in Patent Literature 3, the outer circumferential surface of the first lens and the outer circumferential surface of the second lens are fixed to each other via the adhesive, so that the lens unit formed by stacking and fixing the first and second lenses has a diameter which is larger than a sum of a diameter of the first lens and a diameter of the second lens, due to a thickness of the adhesive. Accordingly, in a case where such a lens unit is used to provide the structure disclosed in Patent Literature 2, the structure merely provides an effect which remains after elimination of the thickness of the lens barrel is canceled out by addition of the thickness of the adhesive.

The present invention is accomplished in view of the problem above. An object of the present invention is to provide a camera module which is both compact and high-quality, an electronic device including the camera module, and a method for manufacturing the camera module.

Solution to Problem

In order to a camera module in accordance with one aspect of the present invention is a camera module including: a lens unit constituted by a plurality of lenses which are stacked on top of each other; and an actuator for driving the lens unit, the plurality of lenses which constitute the lens unit being fixed to each other with use of an adhesive applied between the plurality of lenses, the actuator having an opening for incorporating the lens unit in an optical axis direction, the lens unit being incorporated into the actuator through the opening and held inside the actuator so as to face directly an inner wall surface of the actuator.

Further, in order to attain the object, a method, in accordance with one aspect of the present invention, of manufacturing a camera module is a method of manufacturing a camera module, the camera module including: a lens unit constituted by a plurality of lenses which are stacked on top of each other; and an actuator for driving the lens unit, the method comprising the steps of: preparing the actuator having an opening for incorporating the lens unit in an optical axis direction; manufacturing the lens unit by causing the plurality of lenses to be fixed to each other by applying an adhesive between the plurality of lenses; and (i) incorporating the lens unit into the actuator through the opening of the actuator prepared and (ii) holding the lens unit inside the actuator so that the lens unit directly faces an inner wall surface of the actuator.

According to the arrangement above, it is possible to unitize the plurality of lenses by causing the plurality of lenses to be fixed to each other by applying an adhesive. Accordingly, whereas conventional art involves causing lenses to be fixed to each other with use of a lens barrel and causing the lens barrel to be contained inside an actuator, it is possible, in one aspect of the present invention, to cause the unitized lens unit to be contained directly in the actuator. That is, the lens unit, which is obtained by unitizing the plurality of lenses, can be contained directly in the actuator without use of the lens barrel. This allows a diameter of the camera module to be reduced by a length equal to a thickness of the lens barrel.

Further, conventionally, a lens unit is incorporated while an actuator is being assembled, so that a stain or a scratch may be given to a surface of a lens during a step of incorporating the actuator. However, in the camera module in accordance with one aspect of the present invention, the lens unit can be incorporated through the opening of the actuator after the actuator is assembled. This makes it possible to prevent a stain or a scratch from being given on a surface of each of the plurality of lenses of the lens unit. Accordingly, deterioration of an optical performance of each of the plurality of lenses can be suppressed, so that a defective-product ratio among completed camera modules can be maintained low.

Further, manufacturing the lens unit by unitizing the plurality of lenses into the lens unit in advance makes it possible to evaluate an optical performance of the lens unit alone before incorporating the lens unit into the actuator. This allows a good lens unit whose optical performance is guaranteed to be incorporated in a good actuator. Accordingly, a defective-product ratio among assembled camera modules can be maintained low.

Therefore, according to one aspect of the present invention, it is possible to provide a camera module which has both a small size and a good quality.

Further, in order to attain the object, a camera module in accordance with one aspect of the present invention is a camera module including: a lens unit constituted by a plurality of lenses which are stacked on top of each other; and an actuator for driving the lens unit, the plurality of lenses which constitute the lens unit being fixed to each other by being fitted into each other, the actuator having an opening for incorporating the lens unit in an optical axis direction, the lens unit being incorporated into the actuator through the opening and held inside the actuator so as to face directly an inner wall surface of the actuator.

Further, in order to attain the object, a method, in accordance with one aspect of the present invention, of manufacturing a camera module is a method of manufacturing a camera module, the camera module including: a lens unit constituted by a plurality of lenses which are stacked on top of each other; and an actuator for driving the lens unit, the method comprising the steps of: preparing the actuator having an opening for incorporating the lens unit in an optical axis direction; manufacturing the lens unit by causing the plurality of lenses to be fixed to each other by causing the plurality of lenses to be fitted into each other; and (i) incorporating the lens unit into the actuator through the opening of the actuator prepared and (ii) holding the lens unit inside the actuator so that the lens unit directly faces an inner wall surface of the actuator.

According to the arrangement above, the plurality of lenses can be unitized by causing the plurality of lenses to be fixed to each other by causing the plurality of lenses to be fitted into each other. This allows the unitized lens unit to be contained directly in the actuator and, accordingly, allows the camera module to have a diameter which is reduced by a length equal to a thickness of the lens barrel.

Further, in the camera module in accordance with one aspect of the present invention, the lens unit can be incorporated through the opening of the actuator after the actuator is assembled. Accordingly, deterioration of an optical performance of each of the plurality of lenses can be suppressed, so that a defective-product ratio among completed camera modules can be maintained low. Further, since it is possible to evaluate an optical performance of the lens unit alone before incorporating the lens unit into the actuator, a good lens unit whose optical performance is guaranteed can be incorporated in a good actuator. Accordingly, a defective-product ratio among assembled camera modules can be maintained low.

Therefore, according to one aspect of the present invention, it is possible to provide a camera module which has both a small size and a good quality.

Further, in order to attain the object, an electronic device in accordance with one aspect of the present invention is an electronic device in which any one of the camera modules described above is incorporated.

The arrangement above makes it possible to provide an electronic device which includes a camera module which has both a small size and a good quality.

Additional objects, features, and strengths of the present invention will be made clear by the description below. Further, the advantages of the present invention will be evident from the following explanation in reference to the drawings.

Advantageous Effects of Invention

One aspect of the present invention allows the unitized lens unit to be contained directly in the actuator and, accordingly, allows the camera module to have a diameter which is reduced by a length equal to a thickness of the lens barrel. This makes it possible to provide a small-sized camera module.

Further, in the camera module in accordance with one aspect of the present invention, the lens unit can be incorporated through the opening of the actuator after the actuator is assembled. This makes it possible to prevent a stain or a scratch from being given on a surface of each of the plurality of lenses of the lens unit. Accordingly, deterioration of an optical performance of each of the plurality of lenses can be suppressed, so that a defective-product ratio among completed camera modules can be maintained low. Further, evaluation of an optical performance of the lens unit can be carried out before the lens unit is incorporated into the actuator. This allows a good lens unit to be incorporated in a good actuator. Accordingly, a defective-product ratio among assembled camera modules can be maintained low.

DESCRIPTION OF EMBODIMENTS

The following description will discuss the present invention in detail with reference to embodiments. In the description below, the same reference sign will be given to members having the same function and effect, and description on such members will not be repeated.

(Arrangement of Camera Module 25)

Figure 1:
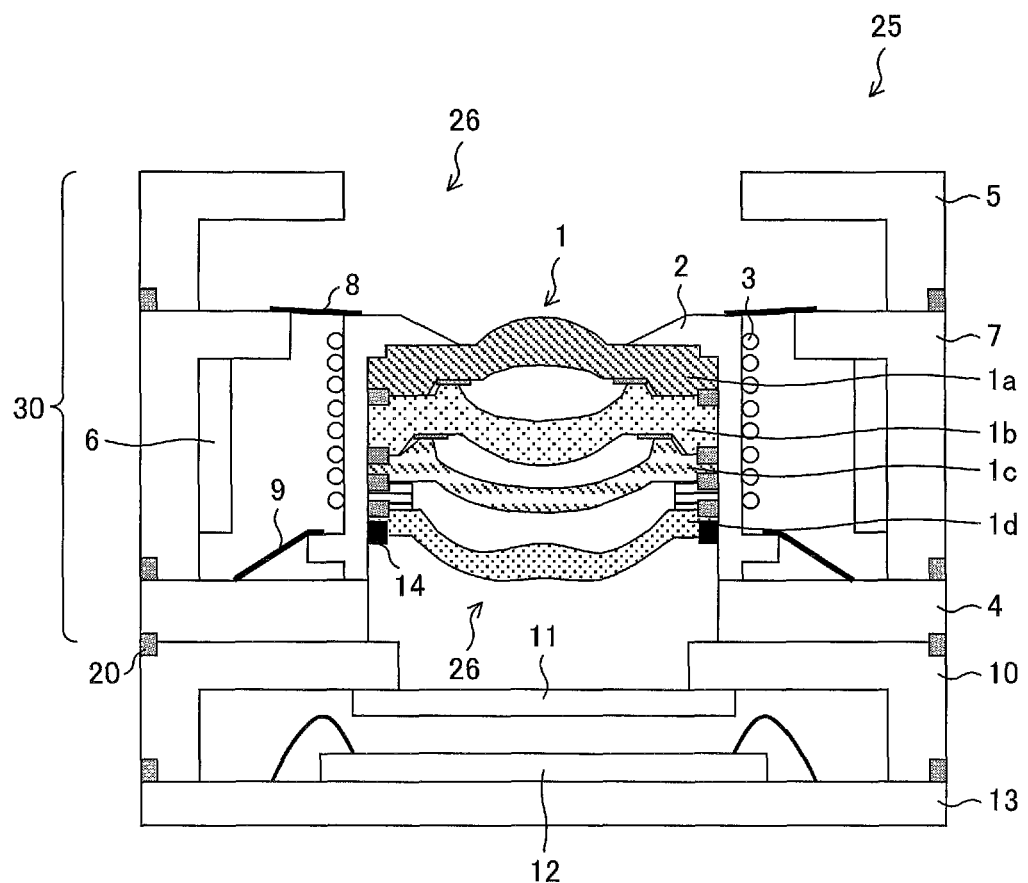
FIG. 1 is a cross-sectional view schematically illustrating an outline arrangement of a camera module in accordance with an embodiment of the present invention.

A camera module in accordance with an embodiment of the present invention is a camera module which is mounted in various electronic devices such as a mobile phone, and can be used when the electronic device is used in a camera mode. A camera module in accordance with an embodiment of the present invention is described below with reference to FIG. 1. FIG. 1 is a cross-sectional view schematically illustrating an outline arrangement of a camera module 25 in accordance with the present embodiment.

As illustrated in FIG. 1, the camera module 25 includes (i) a lens unit 1 constituted by a combination of a plurality of lenses (in FIG. 1, four lenses), (ii) an image pickup device 12 which carries out photoelectric conversion of light having passed the lens unit 1, (iii) an IRC filter 11 having an infrared rays-blocking function, (iv) a substrate 13 for holding the image pickup device 12, (v) a sensor cover 10 which is provided on the substrate 13 so as to cover a whole of the image pickup device 12, and (vi) an actuator 30 which drives the lens unit 1. The sensor cover 10 has an opening on a lens unit 1 side of the sensor cover 10, and the opening is covered by the IRC filter 11. The sensor cover 10, the IRC filter 11, the image pickup device 12, and the substrate 13 are generally called an image pickup section.

The actuator 30 includes (i) a lens carrier 2 which contains the lens unit 1, (ii) a drive coil 3 which is fixed so as to be located at an outer circumference of the lens carrier 2, (iii) a base member 4 which supports a bottom section of the lens carrier 2, (iv) an upper cover 5 which protects an inside of the actuator 30, (v) a magnet 6 which generates a magnetic field for driving the lens unit 1, (vi) a yoke 7 which prevents leakage of the magnetic field, and (vii) an upper leaf spring 8 and a lower leaf spring 9 which hold the lens carrier 2 from above and below, respectively, when the lens unit 1 is driven. The upper cover 5 is provided on an upper surface of the yoke 7, and the yoke 7 is provided on an upper surface of the base member 4.

In the camera module 25, the lens unit 1 is driven in an optical axis direction, so that the lens carrier 2 is driven in the optical axis direction. Specifically, passing an electric current through the drive coil 3 in the magnetic field formed by the magnet 6 generates an electromagnetic force which allows the lens carrier 2 (lens unit 1) to be driven in the optical axis direction. Further, by controlling the electric current which is passed through the drive coil 3, it is possible to control driving of the lens carrier 2 (lens unit 1) in the optical axis direction. This makes it possible to implement an automatic focus (AF) function.

Note that the actuator 30 described above is an actuator of a VCM (Voice Coil Motor) type. However, the actuator 30 is not limited to the VCM type. For example, various types of actuators, for example, a type which uses a stepping motor, a type which uses a piezoelectric element, and the like, can be applied to the actuator 30.

(Arrangement of Lens Unit 1)

Figure 2:
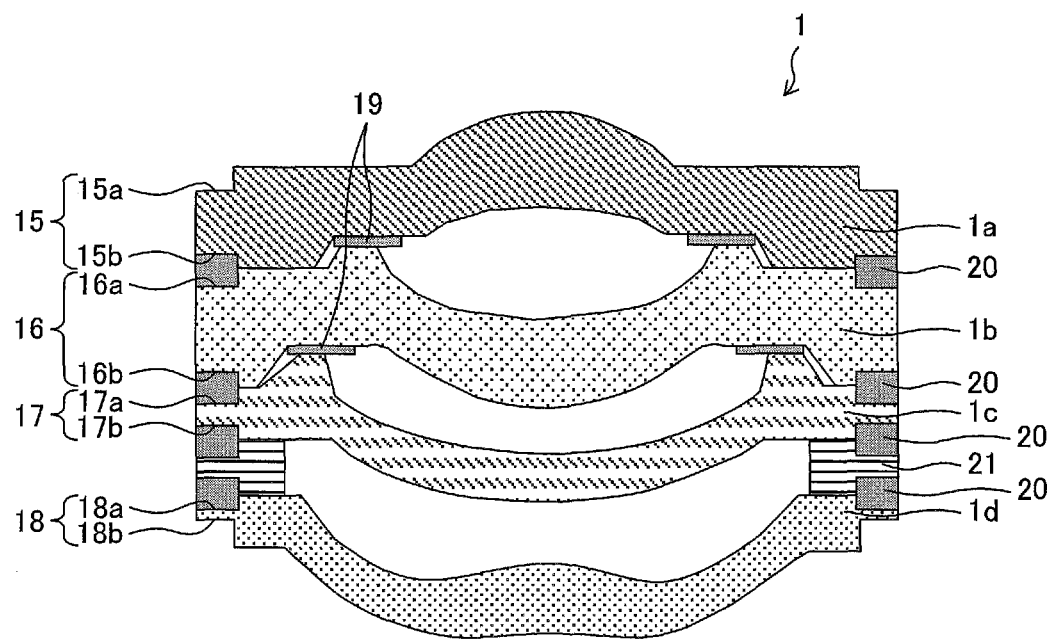
FIG. 2 is a cross-sectional view schematically illustrating an outline arrangement of a lens unit in accordance with an embodiment of the present invention.

An electronic device, such as a mobile phone, in which the camera module 25 is mounted is required to have a small thickness. Accordingly, the camera module 25 as a matter of course is also required to have a small thickness. In view of this, the camera module 25 in accordance with the present embodiment has a characteristic structure in order to meet these requirements. Specifically, the camera module 25 is characterized in that the lens unit 1 is directly incorporated in the lens carrier 2, as illustrated in FIG. 1. That is, the camera module 25 is characterized in that (i) the actuator 30 has an opening 26 for incorporating the lens unit 1 in the optical axis direction and (ii) the lens unit 1 is disposed into the lens carrier 2 through the opening 26 of the actuator 30a and directly faces an inner wall surface of the lens carrier 2. This will be described below with reference to FIG. 2. FIG. 2 is a cross-sectional view schematically illustrating an outline arrangement of the lens unit 1 in accordance with the present embodiment.

The lens unit 1 is constituted by a plurality of lenses. In FIG. 2, the lens unit 1 is constituted by four lenses, that is, a first lens 1a, a second lens 1b, a third lens 1c, and a fourth lens 1d. A step is formed at an edge section of each of the plurality of lenses, and the edge section has a reduced thickness as compared with other portions. More specifically, as illustrated in FIG. 2, a step is formed on both an upper edge surface 15a and a lower edge surface 15b of an edge section 15 of the first lens 1a. Similarly, a step is formed on both an upper edge surface 16a and a lower edge surface 16b of an edge section 16 of the second lens 1b as well, and a step is formed on both an upper edge surface 17a and a lower edge surface 17b of an edge section 17 of the third lens 1c as well. Further, a step is formed also in an upper edge surface 18a and a lower edge surface 18b of an edge section 18 of the fourth lens 1d. In other words, on each of two edge surfaces which face each other and respectively belong to given two adjacent lenses among the plurality of lenses (the four lenses, i.e., the first lens 1a through the fourth lens 1d) constituting the lens unit 1, a step is provided so as to protrude in a direction opposite to a direction in which the step provided on the other of the two edge surfaces protrudes.

In a case where the fourth lens 1d, the third lens 1c, the second lens 1b, and the first lens 1a are stacked on top of each other in this order, a gap is formed between the upper edge surface 18a of the fourth lens 1d and the lower edge surface 17b of the third lens 1c. Similarly, a gap is formed also between the upper edge surface 17a of the third lens 1c and the lower edge surface 16b of the second lens 1b, and between the upper edge surface 16a of the second lens 1b and the lower edge surface 15b of the first lens 1a. The four lenses, i.e., the first lens 1a through the fourth lens 1d can be fixed to each other into a single unit by application of an adhesive 20 to these gaps. The lens unit 1 is contained in the lens carrier 2 and is fixed inside the lens carrier 2 by means of a stopper 14 provided on an inner wall of the lens carrier 2. The stopper 14 presses the lower edge surface 18b of the fourth lens 1d, thereby fixes the lens unit 1 inside the lens carrier 2.

In FIG. 2, a spacer 21 for adjusting a distance between lenses is provided between the third lens 1c and the fourth lens 1d. A step is also formed at an edge portion of each of an upper surface and a lower surface of the spacer 21. This forms a gap between the lower edge surface 17b of the third lens 1c and the spacer 21, and the adhesive 20 is provided to the gap. Similarly, a gap is formed between the upper edge surface 18a of the fourth lens 1d and the spacer 21, and the adhesive 20 is provided to the gap. In this way, the third lens 1c and the fourth lens 1d are each joined to the spacer 21 by means of the adhesive, so that each of the third lens 1c and the fourth lens 1d is not easily separated from the spacer 21. A position in which the spacer 21 is provided and the number of spacers 21 provided are not limited, and the spacer 21 can be provided as appropriate between the plurality of lenses. Note that, conventionally, in order to adjust a distance between lenses, the lenses are formed by injection molding so as to have a shape that allows a desired distance to be achieved between the lenses. Formation of such a shape, however, involves difficulty. In view of this, in the present embodiment, it is possible to adjust a distance between lenses by use of the spacer 21, without using lenses each having a shape that is difficult to form.

Further, in FIG. 2, a light-shielding plate 19 is provided between the first lens 1a and the second lens 1b and between the second lens 1b and the third lens 1c. The light-shielding plates 19 are each provided for the purpose of (i) preventing unwanted light from entering an outer side of a lens and (ii), accordingly, suppressing occurrence of ghost and flare. A position in which each light-shielding plate 19 is provided and the number of the light-shielding plate(s) 19 provided are not limited, and a light-shielding plate 19 can be provided as appropriate between the plurality of lenses. Note that the spacer 21 can be made of a light-shielding material so as to function as a light-shielding plate.

At this time, in the camera module 25, outer wall surfaces (side surfaces substantially parallel to the optical axis direction) of the respective plurality of lenses and an outer wall surface of the spacer 21 are aligned with each other, so that the optical axis is defined (the optical axis is aligned). In this case, an edge surface of each of the plurality of lenses can be minimized, so that a diameter of the each of the plurality of lenses can be reduced. This allows the lens unit 1 to have a smaller size.

Further, in the camera module 25, a protrusion is provided on the upper edge surface 16a of the second lens 1b and on the upper edge surface 17a of the third lens 1c. Specifically, on the upper edge surface 16a of the second lens 1b, a protrusion is provided in a position corresponding to the light-shielding plate 19 between the first lens 1a and the second lens 1b. Similarly, on the upper edge surface 17a of the third lens 1c, a protrusion is provided in a position corresponding to the light-shielding plate 19 between the second lens 1b and the third lens 1c. Alignment of the light-shielding plates 19 is carried out by use of these protrusions, and each light-shielding plate 19 is disposed on top of a corresponding one of the protrusions. In this case, each light-shielding plate 19 can be provided to the camera module 25 without use of an adhesive.

As described above, by applying the adhesive 20 to the gaps formed by the steps provided at the edge sections of the plurality of lenses, it is possible to cause the first lens 1a through the fourth lens 1d to be fixed to each other so as be unitized. As such, whereas conventional art involves fixing lenses to each other with use of a lens barrel and containing the lens barrel inside a lens carrier, it is possible in the present embodiment to contain the unitized lens unit 1 directly in the lens carrier 2. That is, the lens unit 1, which is obtained by unitizing the first lens 1a through the fourth lens 1d, can be directly contained in the lens carrier 2 without use of the lens barrel. Accordingly, the camera module 25 can have a diameter which is reduced by a length equal to a thickness of the lens barrel.

In particular, in the camera module 25 in accordance with the present embodiment, since the adhesive 20 is applied to the gaps formed by the steps provided in the edge sections of the plurality of lenses, the adhesive 20 does not reach an outer circumferential surface of each of the plurality of lenses. To be more exact, the adhesive 20 is not present on an outer circumferential surface of the lens unit 1, and the outer circumferential surface of the lens unit 1 directly faces the inner wall surface of the lens carrier 2. As such, a diameter of the lens unit 1 does not become longer than a diameter of each of the plurality of lenses (the four lenses, i.e., the first lens 1a through the fourth lens 1d) by a length equal to a thickness of the adhesive 20. That is, the diameter of the lens unit 1 which is unitized is substantially equal to the diameter of each of the plurality of lenses (the four lenses, i.e., the first lens 1a through the fourth lens 1d). In this way, a small-sized camera module can be provided.

Further, conventionally, a lens unit is incorporated while an actuator is being assembled, so that a stain or a scratch may be given to a surface of a lens during a step of incorporating the actuator. However, in the camera module 25 in accordance with the present embodiment, the lens unit 1 can be incorporated through the opening 26 of the actuator 30 after the actuator 30 is assembled. This makes it possible to prevent a stain or a scratch from being given on a surface of each of the plurality of lenses of the lens unit 1. Accordingly, deterioration of an optical performance of each of the plurality of lenses can be suppressed, so that a defective-product ratio among completed camera modules 25 can be maintained low.

Note that although a step is provided on both the upper edge surface 15a and the lower edge surface 15b of the first lens 1a, and a step is provided on both the upper edge surface 18a and the lower edge surface 18b of the fourth lens 1d in FIG. 2, it is only necessary that a step is provided at least on the lower edge surface 15b of the first lens 1a and the upper edge surface 18a of the fourth lens 1d.

Further, although a protrusion is provided on the upper edge surface 16a of the second lens 1b and on the upper edge surface 17a of the third lens 1c in FIG. 2, the present embodiment is not necessarily limited to this. For example, in a case where the camera module 25 is manufactured in such a manner that the first lens 1a is provided on a lower side, it is more preferable that a protrusion be provided on the lower edge surface 15b of the first lens 1a and on the lower edge surface 16b of the second lens 1b. In this case, the light-shielding plates 19 can be provided on top of the respective protrusions.

Note that although the description above deals with an example case in which the plurality of lenses are unitized by application of the adhesive 20 to the gaps formed by the steps provided at the edge sections of the plurality of lenses, the present embodiment is not necessarily limited to this. For example, it is possible to fix the plurality of lenses to each other by (i) providing a protruding shape on one of two edge surfaces which face each other and respectively belong to any two adjacent lenses among the plurality of lenses (the four lenses, i.e., the first lens 1a through the fourth lens 1d) constituting the lens unit 1, (ii) providing a recessed shape on the other of the two edge surfaces, and (iii) causing the protruding shape and the recessed shape, which are formed on the respective two edge surfaces, to be engaged with each other or fitted into each other.

(Modified Examples of Lens Unit 1)

Figure 3:
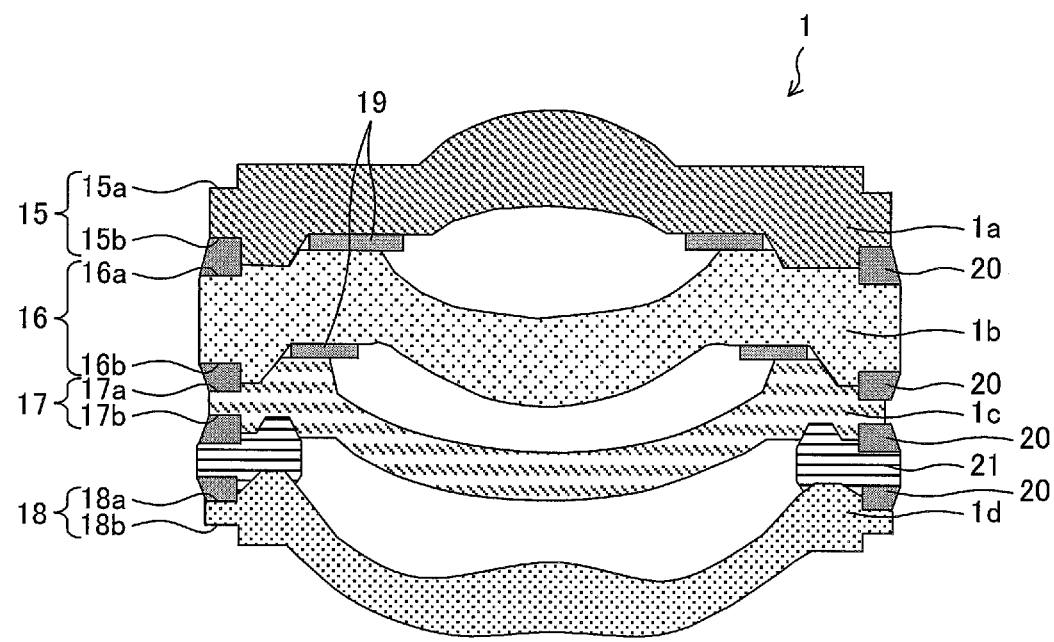
FIG. 3 is a cross-sectional view schematically illustrating an outline arrangement of a modified example of a lens unit in accordance with an embodiment of the present invention.
Figure 4:
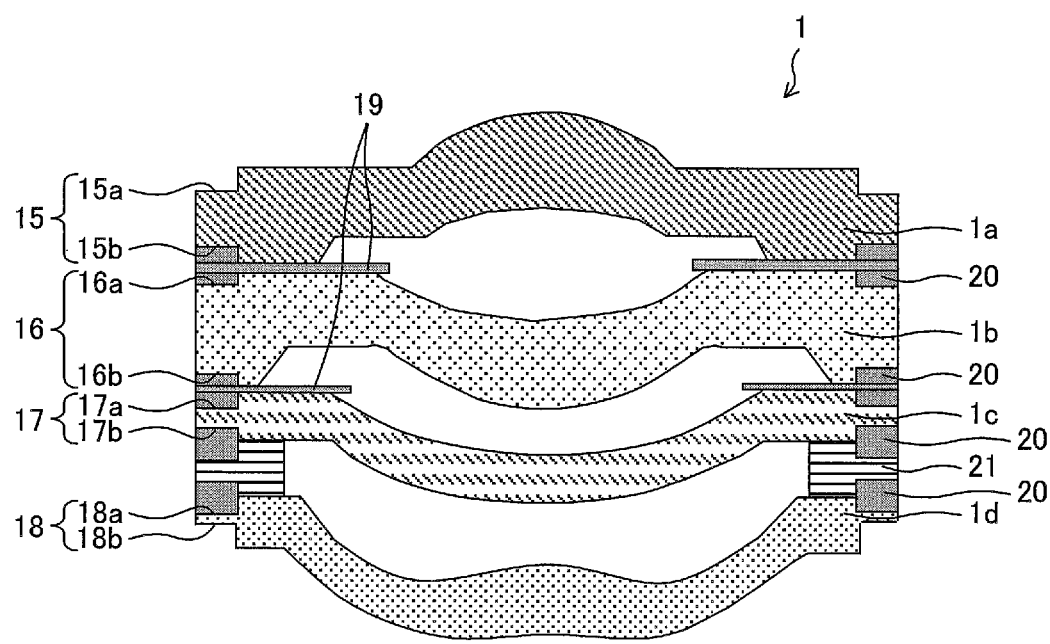
FIG. 4 is a cross-sectional view schematically illustrating an outline arrangement of a modified example of a lens unit in accordance with an embodiment of the present invention.

Arrangements other than the arrangement in which the first lens 1a through the fourth lens 1d are fixed to each other by application of the adhesive 20 to the gaps formed by the steps provided at the edge sections of the respective plurality of lenses are not necessarily limited to the above-described arrangements. Thus, two modified examples of the lens unit 1 are shown in FIGS. 3 and 4, respectively. FIGS. 3 and 4 are cross-sectional views schematically illustrating outline arrangements of the respective modified examples of the lens unit 1 in accordance with the present embodiment. The following description will only deal with differences between each modified example and the embodiment described above.

In a lens unit 1 illustrated in FIG. 3, a plurality of lenses and a spacer 21 are configured to be engaged with each other or fitted into each other. Specifically, a lower edge surface 15b of a first lens 1a includes a recessed shape which is configured to be engaged with or fitted into a protrusion (protruding shape) which is for alignment of a light-shielding plate 19 and provided on an upper edge surface 16a of a second lens 1b. Similarly, a lower edge surface 16b of the second lens 1b includes a recessed shape which is configured to be engaged with or fitted into a protrusion (protruding shape) which is for alignment of a light-shielding plate 19 and provided on an upper edge surface 17a of a third lens 1c.

Further, a protruding shape is formed on an upper surface of the spacer 21, and a recessed shape is formed on a lower surface of the spacer 21. A recessed shape is formed on a lower edge surface 17b of the third lens 1c so as to be engaged with or fitted into the protruding shape on the upper surface of the spacer 21. Similarly, a protruding shape is formed on an upper edge surface 18a of a fourth lens 1d so as to be engaged with or fitted into the recessed shape on the lower surface of the spacer 21.

By causing the plurality of lenses and the spacer 21 to be engaged with or fitted into each other, it is possible to carry out alignment of each of the plurality of lenses and alignment of the spacer 21. That is, by solely using the protruding shapes and the recessed shapes provided to the plurality of lenses and the spacer 21, it is possible to define the optical axis of lens unit 1 (align the optical axis).

Note that although a protrusion is provided on the upper edge surface 16a of the second lens 1b and on the upper edge surface 17a of the third lens 1c and a recessed shape is provided on the lower edge surface 15b of the first lens 1a and on the lower edge surface 16b of the second lens 1b in FIG. 3, the present embodiment is not necessarily limited to this. For example, in a case where the camera module 25 is manufactured in such a manner that the first lens 1a is provided on a lower side, it is more preferable that (i) a recessed shape be provided on the upper edge surface 16a of the second lens 1b and on the upper edge surface 17a of the third lens 1c and (ii) a protrusion be provided on the lower edge surface 15b of the first lens 1a and on the lower edge surface 16b of the second lens 1b. In this case, alignment of each of the plurality of lenses and alignment of the spacer 21 can each be carried out by (i) providing the light-shielding plates 19 on top of the respective protrusions and (ii) causing the plurality of lenses and the spacer 21 to be engaged with or fitted into each other.

Further, in a lens unit 1 illustrated in FIG. 4, no protrusion for alignment of a light-shielding plate 19 is provided on an upper edge surface 16a of a second lens 1b and on an upper edge surface 17a of a third lens 1c. In the present modified example, a light-shielding plate 19 is provided between a lower edge surface 15b of a first lens 1a and the upper edge surface 16a of the second lens 1b, and has an outer diameter substantially equal to that of each of these lenses. Accordingly, an outer edge portion of the light-shielding plate 19 reaches an outer wall surface of each of the first lens 1a and the second lens 1b. Similarly, another light-shielding plate 19 is provided between a lower edge surface 16b of the second lens 1b and the upper edge surface 17a of the third lens 1c, and also has an outer diameter substantially equal to that of each of these lenses. Accordingly, an outer edge portion of the another light-shielding plate 19 reaches an outer wall surface of each of the second lens 1b and the third lens 1c.

In this case, in a state where a fourth lens 1d, the third lens 1c, the second lens 1b, the first lens 1a, and the two light-shielding plates 19 are stacked on top of each other in this order, a gap is formed between the upper edge surface 17a of the third lens and a lower surface of a corresponding light-shielding plate 19, and between the upper surface of the corresponding light-shielding plate 19 and the lower edge surface 16b of the second lens 1b. Similarly, a gap is formed also between the upper edge surface 16a of the second lens and a lower surface of a corresponding light-shielding plate 19, and between an upper surface of the corresponding light-shielding plate and the lower edge surface 15b of the first lens 1a. By applying the adhesive 20 to these gaps, it is possible to cause the two light-shielding plates 19 and the four lenses, i.e., the first lens 1a through the fourth lens 1d to be fixed to each other into a single unit. At this time, in the camera module 25, outer wall surfaces (side surfaces substantially parallel to the optical axis direction) of the four lenses, an outer wall surface of the spacer 21, and outer wall surfaces of the two light-shielding plates 19 are aligned with each other, so that the optical axis is defined (the optical axis is aligned). In this case, an edge surface of each of the four lenses can be minimized, so that the each of the plurality of lenses can have a reduced diameter. This allows the lens unit 1 to have a further smaller size.

(Modified Examples of Stopper 14)

Figure 5:
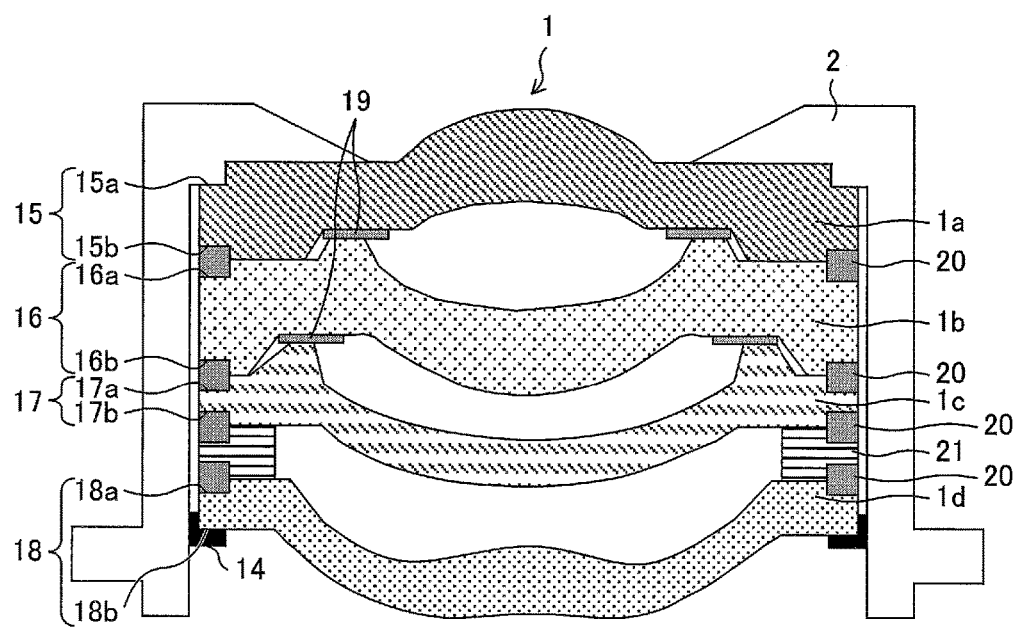
FIG. 5 is a cross-sectional view schematically illustrating an outline arrangement of a modified example of a stopper in accordance with an embodiment of the present invention.
Figure 6:
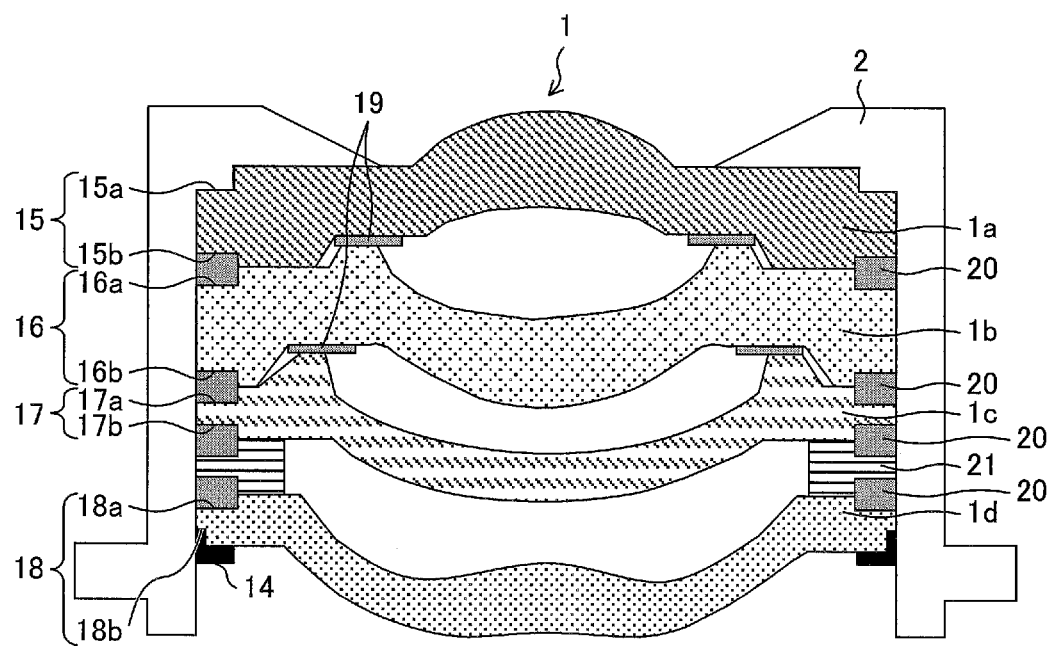
FIG. 6 is a cross-sectional view schematically illustrating an outline arrangement of a modified example of a stopper in accordance with an embodiment of the present invention.

As described above, the stopper 14 is provided on the inner wall of the lens carrier 2, and presses the lower edge surface 18b of the fourth lens 1d to thereby fix the lens unit 1 inside the lens carrier 2. The stopper 14 can be provided on the inner wall of the lens carrier 2 by means of an adhesive, but the present embodiment is not necessarily limited to this. Thus, the following description will discuss two modified examples, respectively illustrated in FIGS. 5 and 6, of the stopper 14 for fixing the lens unit 1 inside the lens carrier 2. FIGS. 5 and 6 are cross-sectional views schematically illustrating outline arrangements of the respective modified examples of the stopper 14 in accordance with the present embodiment. The following description will only deal with differences between the above-described embodiment and each of the two modified examples.

A stopper 14 illustrated in FIG. 5 has an L shape and is fitted into a gap between a lens unit 1 and a lens carrier 2. The stopper 14 fitted into the gap presses a lower edge surface 18b of a fourth lens 1d to thereby fix the lens unit 1 inside the lens carrier 2. In this case, it is not necessary to provide a step on the lower edge surface 18b of the fourth lens 1d. According to this arrangement, a position of the lens unit 1 relative to the lens carrier 2 is fixed by the stopper 14. This makes it possible to align the lens unit 1 by making use of the fitting of the stopper 14 into the gap.

As shown in FIG. 5, the lens unit 1 of FIG. 1 is configured such that: only a part of an edge surface of a lens 1a positioned furthest from the opening contacts the inner wall surface of the actuator, a remaining part of the edge surface of the lens 1a positioned furthest from the opening does not contact the inner wall surface of the actuator, and the other lens(es) 1b, 1c, 1d are not in contact with the inner wall surface of the actuator.

A stopper 14 illustrated in FIG. 6 also has an L shape, but a step is provided on a lower edge surface 18b of a fourth lens 1d. The stopper 14 is configured to be fitted into a gap between (i) the step provided on the lower edge surface 18b of the fourth lens 1d and (ii) a lens carrier 2. Also with this arrangement, the stopper 14 fitted into the gap presses the lower edge surface 18b of the fourth lens 1d to thereby fix a lens unit 1 inside the lens carrier 2. Also by this arrangement, a position of the lens unit 1 relative to the lens carrier 2 is fixed by means of the stopper 14. This makes it possible to align the lens unit 1 by making use of the fitting of the stopper 14 into the gap.

Note that although the description above has shown arrangements in each of which the lens unit 1 is aligned by making use of the stopper illustrated in FIG. 5 or 6, the present embodiment is not necessarily limited to this. For example, alignment of the lens unit 1 can be carried out by (i) providing a step at a portion (front diaphragm) of the lens carrier 2 which portion is in contact with an upper edge surface 15a of a first lens 1a and (ii) causing the step and the step provided on the upper edge surface 15a of the first lens 1a to be fitted into each other.

Further, although the description above has shown arrangements in each of which the lens unit 1 is fixed inside the lens carrier 2 by means of the stopper 14, the present embodiment is not necessarily limited to this. For example, it is possible to employ an arrangement in which (i) the lens unit 1 is contained inside the lens carrier 2, (ii) an adhesive is applied to an inner wall of the lens carrier 2 and to the lower edge surface 18b of the fourth lens 1d of the lens unit 1, and (iii) the lens carrier 2 and the lens unit 1 are fixed to each other directly by means of the adhesive.

(Modified Examples of Lens Carrier 2 and Sensor Cover 10)

Figure 7:
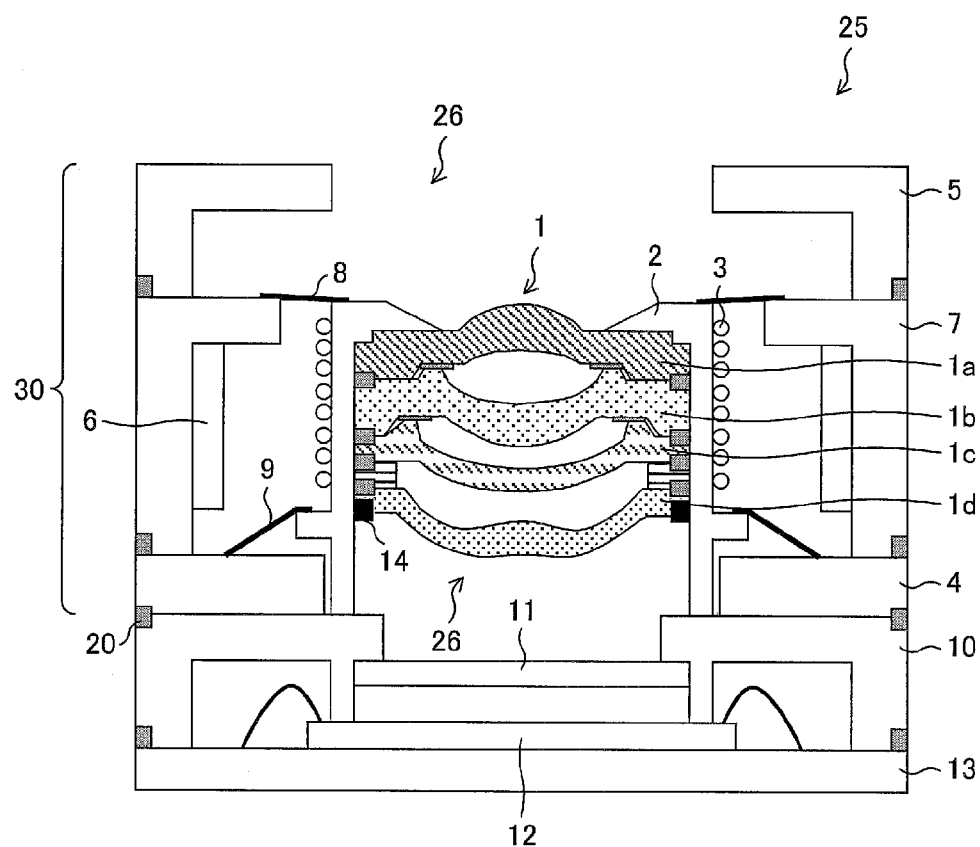
FIG. 7 is a cross-sectional view schematically illustrating an outline arrangement of a modified example of a lens carrier and a sensor cover in accordance with an embodiment of the present invention.
Figure 8:
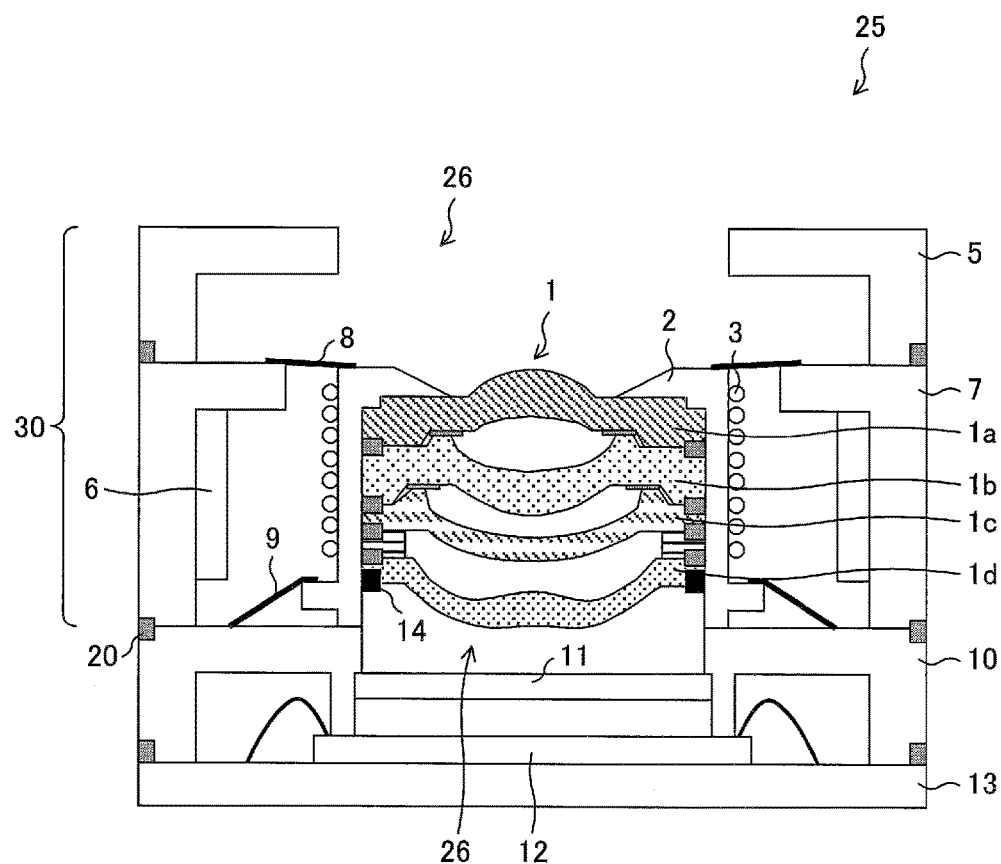
FIG. 8 is a cross-sectional view schematically illustrating an outline arrangement of a modified example of a lens carrier and a sensor cover in accordance with an embodiment of the present invention.

As described above, the lens carrier 2 abuts against the base member 4, and the sensor cover 10 is provided on the substrate 13 so as to cover a whole of the image pickup device 12. Note, however, that the present embodiment is not necessarily limited to this. Thus, the following description will discuss two modified examples, respectively illustrated FIGS. 7 and 8, of the lens carrier 2 and the sensor cover 10. FIGS. 7 and 8 are cross-sectional views schematically illustrating outline arrangements of the respective modified examples of the lens carrier 2 and the sensor cover 10 in accordance with the present embodiment. The following description will only deal with differences between the above-described embodiment and each of the two modified embodiments.

In FIG. 7, a bottom section of a lens carrier 2 abuts against an upper surface of a sensor cover 10, and the sensor cover 10 includes a portion which abuts against an image pickup device 12. This allows a position of a lens unit 1 relative to the image pickup device 12 to be determined with precision. Further, causing the lens carrier 2 to abut against the sensor cover 10 makes it possible to (i) reduce the number of parts interposed between the lens unit 1 and the image pickup device 12 and (ii), accordingly, suppress an influence of part tolerance variations.

In FIG. 8, a sensor cover 10 includes a portion which abuts against an image pickup device 12 and, further, the sensor cover 10 serves also as a base member 4. Accordingly, a lens carrier 2 abuts against the sensor cover 10, and a lower leaf spring 9 for holding the lens carrier 2 also abuts against the sensor cover 10. The base member 4 and the sensor cover 10 can thus be integrated. In this case, the number of parts interposed between a lens unit 1 and the image pickup device 12 can be further reduced.

(Modified Example of Actuator 30)

Figure 9:
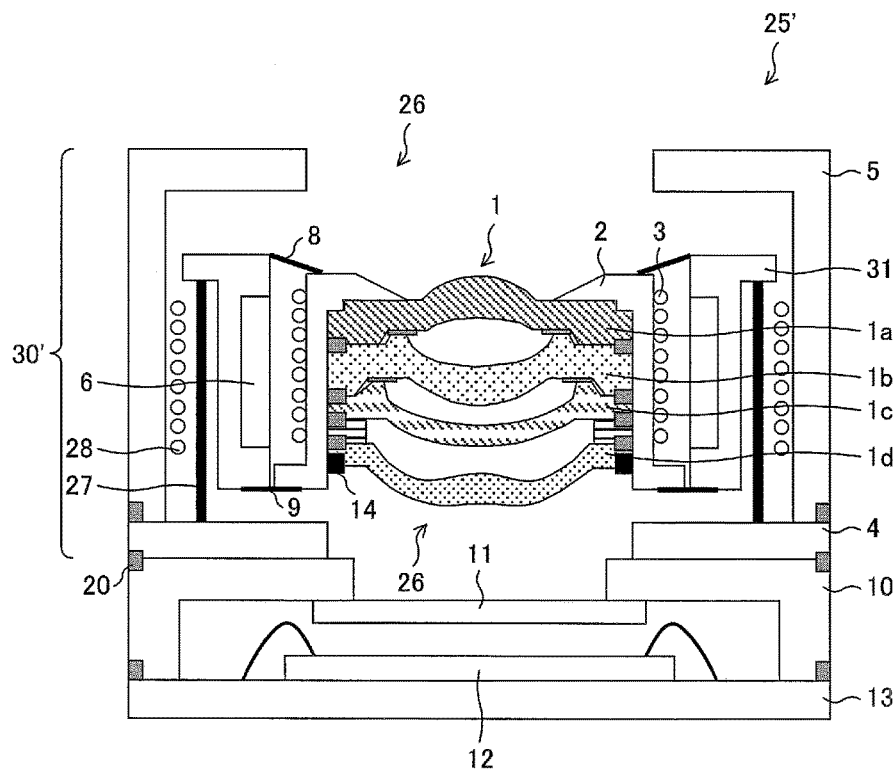
FIG. 9 is a cross-sectional view schematically illustrating an outline arrangement of a modified example of an actuator in accordance with an embodiment of the present invention.

FIG. 9 illustrates a modified example corresponding to a case in which the actuator 30 is an automatic focus actuator equipped with an optical image stabilizer (OIS). FIG. 9 is a cross-sectional view schematically illustrating an outline arrangement of a camera module 25' which includes an actuator 30' in accordance with the present modified example.

The actuator 30' can employ, for example, an arrangement of an automatic focus actuator equipped with an OIS disclosed in Japanese Patent Application Publication, Tokukai, No. 2011-65140 A. Specifically, the actuator 30' has a structure in which a drive section (including a lens carrier 2, a drive coil 3, a magnet 6, and a magnet holder 31) which drives a lens unit 1 is supported by a suspension wire 27. More specifically, the magnet holder 31 and a lens carrier 2 are supported by an upper leaf spring 8 and a lower leaf spring 9, and the magnet holder 31 is supported by the suspension wire 27 attached to a base member 4. As a result, a whole of the drive section is supported by the suspension wire 27, and the suspension wire 27 supports the drive section so as to prevent the drive section from being in contact with the base member 4, that is, so as to secure a distance between the drive section and the base member 4. In other words, the lens unit 1 is supported by the suspension wire so as to have a distance between the lens unit 1 and the base member 4. In the present modified example, an upper cover 5 is provided on an upper surface of the base member 4, and the magnet holder 31 is provided inside the upper cover 5.

In the actuator 30', a camera shake compensation coil 28 is fixed so as to be located at an outer circumference of the suspension wire 27. Further, the base member 4 has an opening 26 for incorporating the lens unit 1. The lens unit 1 is incorporated though the opening 26 of the base member 4 and is held so as to face directly an inner wall surface of the lens carrier 2. In this way, the actuator 30 described above can be applied to an automatic focus actuator equipped with an OIS such as the actuator 30' in accordance with the present modified example.

(Method of Manufacturing Camera Module 25)

Figure 10:
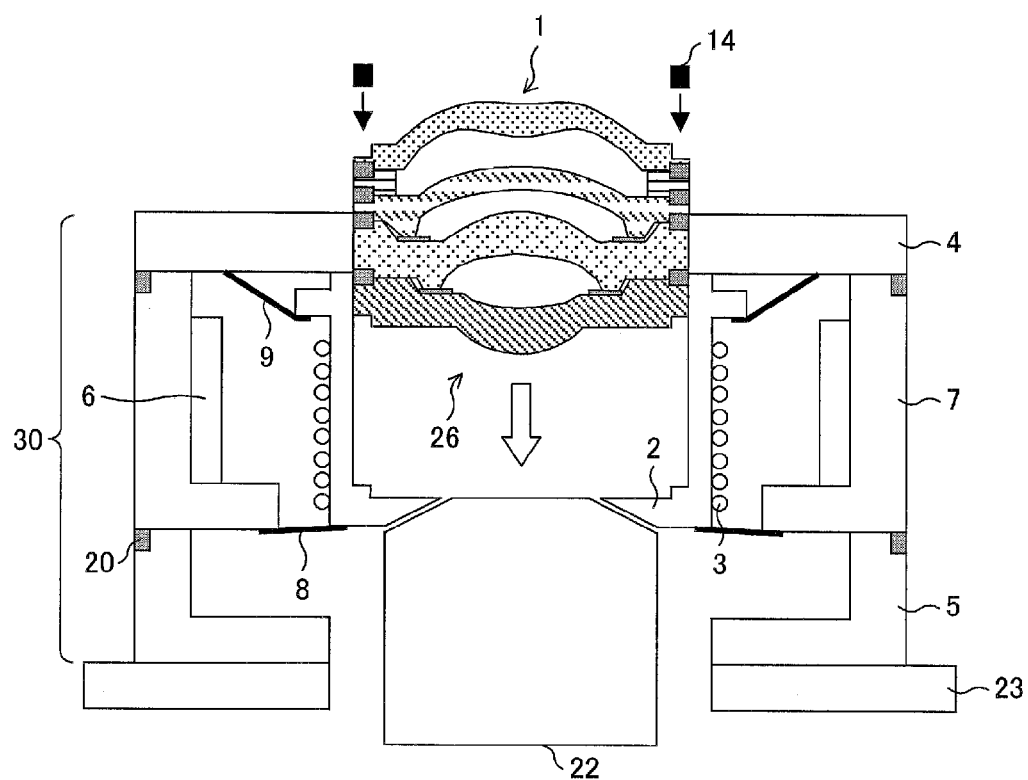
FIG. 10 is a cross-sectional view schematically illustrating an outline arrangement corresponding to a case in which a lens unit in accordance with an embodiment of the present invention is incorporated from a side opposite to an image pickup device side.
Figure 11:
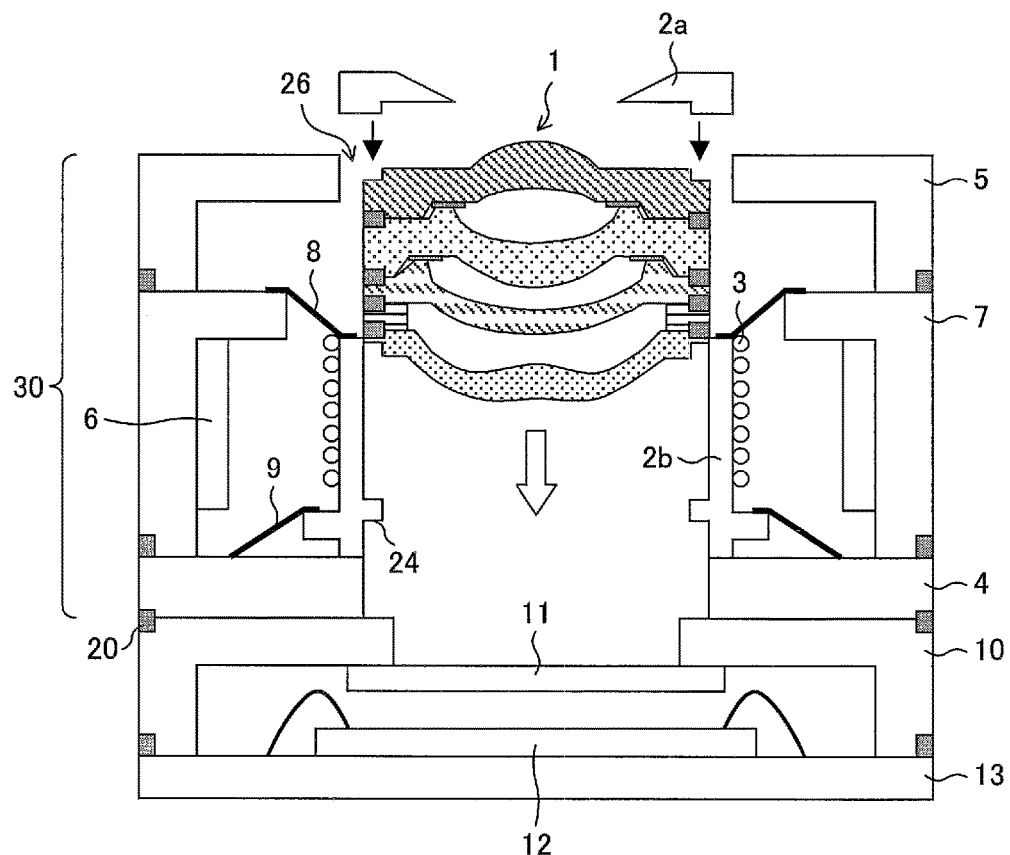
FIG. 11 is a cross-sectional view schematically illustrating an outline arrangement corresponding to a case in which a lens unit in accordance with an embodiment of the present invention is incorporated from an image pickup device side.

The following description will discuss, with reference to FIGS. 10 and 11, a method of manufacturing the camera module 25. FIG. 10 is a cross-sectional view schematically illustrating an outline arrangement corresponding to a case in which the lens unit 1 is incorporated from a side opposite to an image pickup device 12 side. FIG. 11 is a cross-sectional view schematically illustrating an outline arrangement corresponding to a case in which the lens unit 1 is incorporated from the image pickup device 12 side.

First, the following description will discuss a method of manufacturing the camera module 25 by incorporating the lens unit 1 from the side opposite to the image pickup device 12 side. As illustrated in FIG. 10, the actuator 30 is prepared on a stage 23 having an opening, in such a manner that the actuator 30 is disposed upside down. At this time, a jig 22 is passed through the opening of the stage 23 so as to hold the lens carrier 2 so that the lens carrier 2 abuts against the base member 4. This fixes the lens carrier 2, so that no unnecessary load is applied to the upper leaf spring 8 and the lower leaf spring 9. This makes it possible to prevent damage of the upper leaf spring 8 and the lower leaf spring 9.

In this state, the lens unit 1 is inserted, while the fourth lens 1d is positioned at the top, into the lens carrier 2 through the opening 26 on the base member 4 side. More specifically, the lens unit 1 is inserted into the lens carrier 2 of the actuator 30 so that the lens unit 1 directly faces the inner wall surface of the lens carrier 2. Further, the stopper 14 is inserted into the lens carrier 2 from the base member 4 side so as to fix the lens unit 1. As described above, the lens unit 1 can be fixed by bonding the stopper 14 to the inner wall of the lens carrier 2 so as to press the lens unit 1, or by causing the stopper 14 to be fitted into a gap between the lens unit 1 and the lens carrier 2 so as to press the lens unit 1. Or alternatively, the lens unit 1 can be fixed by applying an adhesive directly to the inner wall of the lens carrier 2 and the lower edge surface 18b of the fourth lens 1d of the lens unit 1, instead of using the stopper 14. In this way, the camera module 25 is manufactured.

Note that although the description above has shown an arrangement in which the actuator 30 positioned upside down is placed on the stage 23 and the lens unit 1 positioned upside down is inserted into the lens carrier 2, it is also possible to employ an arrangement reverse to this arrangement. Specifically, the camera module 25 can be manufactured by (i) placing, on the stage 23, the lens unit 1 disposed on the stopper 14 and (ii) providing the actuator 30 over the lens unit 1.

Next, the following description will discuss a method of manufacturing the camera module 25 by incorporating the lens unit 1 from the image pickup device 12 side. As illustrated in FIG. 11, the lens carrier 2 provided on the actuator 30 is divided into (i) an upper lens carrier 2a, which is a portion (front diaphragm) of the lens carrier 2 which portion is brought in contact with the upper edge surface 15a of the first lens 1a and (ii) a lower lens carrier 2b, which is a remaining cylindrical portion. At this time, the lower lens carrier 2b includes a stopper section 24 which is equivalent to the stopper 14 and provided at a predetermined position. The predetermined position is a position that allows the lens unit 1 to be positioned at a predetermined level when the lens unit 1 is inserted into the lower lens carrier 2b.

The actuator 30 is prepared, and is disposed in a state where the upper lens carrier 2a of the lens carrier 2 is eliminated. In this state, the lens unit 1 is inserted, while the first lens 1a is positioned at the top, into the lower lens carrier 2b through the opening 26 on an upper cover 5 side until the fourth lens 1d abuts against the stopper section 24, so that the lens unit 1 is fixed. More specifically, the lens unit 1 is inserted into the lower lens carrier 2b of the actuator 30 so as to face directly the inner wall surface of the lower lens carrier 2b. Further, the upper lens carrier 2a is provided over the lens unit 1 and fixed by means of an adhesive or the like. The camera module 25 can be manufactured also in this way Note that a method of manufacturing the lens unit 1 is as described at the beginning. Specifically, two edge surfaces which (i) respectively belong to any two adjacent lenses among the plurality of lenses (the four lenses, i.e., the first lens 1a through the fourth lens 1d) and (ii) face each other have respective steps each of which protrudes toward a side opposite to one of the two edge surfaces which one faces the each of the steps. Accordingly, a gap is formed between the upper edge surface 18a of the fourth lens 1d and the lower edge surface 17b of the third lens 1c in a case where the fourth lens 1d, the third lens 1c, the second lens 1b, and the first lens 1a are stacked on top of each other in this order. Similarly, a gap is formed also between the upper edge surface 17a of the third lens 1c and the lower edge surface 16b of the second lens 1b, and between the upper edge surface 16a of the second lens 1b and the lower edge surface 15b of the first lens 1a. By applying the adhesive 20 to these gaps, it is possible to cause the four lenses, i.e., the first lens 1a through the fourth lens 1d, to be fixed to each other into a single unit, so that the lens unit 1 can thus be manufactured.

Conventionally, after an image pickup section is assembled, a bottom section of an actuator is disposed on top of the image pick up section and then the lens unit is assembled on top of the bottom section. Lastly, other members of the actuator are assembled. That is, conventionally, a camera module is assembled in the order of a lower portion to an upper portion of the camera module. Since the lens unit is incorporated while the actuator is being assembled in this manner, a stain or a scratch may be given to a surface of a lens during a step of incorporating the actuator. In addition, conventional assembly steps were complicated.

Further, conventionally, evaluation of lenses in terms of optical performance is carried out after the actuator is assembled. That is, it is impossible to evaluate an optical performance of the lens unit until the actuator is completed. In this case, a defect of a lens results in a defect of a whole product including the actuator, so that a cost of defective work is increased. This may cause (i) an increase in defective-product ratio among completed actuators and (ii) a decrease in production efficiency, accordingly.

By contrast, the camera module 25 in accordance with the present embodiment is manufactured in such a manner that, after the actuator 30 is assembled, the lens unit 1 is incorporated through the opening 26 of the actuator 30. As such, it is not necessary to insert the lens unit 1 while the actuator 30 is being assembled. This makes it possible to prevent a stain or a scratch from being given on a surface of each of the plurality of lenses of the lens unit 1. Accordingly, deterioration of an optical performance of each of the plurality of lenses can be suppressed, so that a defective-product ratio among completed camera modules 25 can be maintained low.

Further, manufacturing the lens unit by unitizing the plurality of lenses into the lens unit in advance makes it possible to evaluate an optical performance of the lens unit alone before incorporating the lens unit into the actuator. This allows a good lens unit whose optical performance is guaranteed to be incorporated in a good actuator. Accordingly, a defective-product ratio among assembled camera modules can be maintained low.

The present invention is not limited to the above-described embodiments but allows various modifications within the scope of the claims. In other words, any embodiment derived from a combination of two or more technical means appropriately modified within the scope of the claims will also be included in the technical scope of the present invention.

[Conclusion of Embodiment]

As described above, a camera module (25) in accordance with Aspect 1 of the present invention is a camera module including: a lens unit (i) constituted by a plurality of lenses which are stacked on top of each other; and an actuator (30) for driving the lens unit, the plurality of lenses which constitute the lens unit being fixed to each other with use of an adhesive (20) applied between the plurality of lenses, the actuator having an opening (26) for incorporating the lens unit in an optical axis direction, the lens unit being incorporated into the actuator through the opening and held inside the actuator so as to face directly an inner wall surface of the actuator.

Further, a method, in accordance with Aspect 2 of the present invention, of manufacturing a camera module (25) is a method of manufacturing a camera module, the camera module including: a lens unit (1) constituted by a plurality of lenses which are stacked on top of each other; and an actuator (30) for driving the lens unit, the method comprising the steps of: preparing the actuator having an opening (26) for incorporating the lens unit in an optical axis direction; manufacturing the lens unit by causing the plurality of lenses to be fixed to each other by applying an adhesive (20) between the plurality of lenses; and (i) incorporating the lens unit into the actuator through the opening of the actuator prepared and (ii) holding the lens unit inside the actuator so that the lens unit directly faces an inner wall surface of the actuator.

According to the arrangement above, it is possible to unitize the plurality of lenses by causing the plurality of lenses to be fixed to each other by applying an adhesive. Accordingly, whereas conventional art involves causing lenses to be fixed to each other with use of a lens barrel and causing the lens barrel to be contained inside an actuator, it is possible, in one aspect of the present invention, to cause the unitized lens unit to be contained directly in the actuator. That is, the lens unit, which is obtained by unitizing the plurality of lenses, can be contained directly in the actuator without use of the lens barrel. This allows a diameter of the camera module to be reduced by a length equal to a thickness of the lens barrel.

Further, conventionally, a lens unit is incorporated while an actuator is being assembled, so that a stain or a scratch may be given to a surface of a lens during a step of incorporating the actuator. However, in the camera module in accordance with one aspect of the present invention, the lens unit can be incorporated through the opening of the actuator after the actuator is assembled. This makes it possible to prevent a stain or a scratch from being given on a surface of each of the plurality of lenses of the lens unit. Accordingly, deterioration of an optical performance of each of the plurality of lenses can be suppressed, so that a defective-product ratio among completed camera modules can be maintained low.

Further, manufacturing the lens unit by unitizing the plurality of lenses into the lens unit in advance makes it possible to evaluate an optical performance of the lens unit alone before incorporating the lens unit into the actuator. This allows a good lens unit whose optical performance is guaranteed to be incorporated in a good actuator.

Accordingly, a defective-product ratio among assembled camera modules can be maintained low.

Therefore, according to one aspect of the present invention, it is possible to provide a camera module which has both a small size and a good quality.

Further, a camera module in accordance with Aspect 3 of the present invention can have an arrangement identical to that of Aspect 1 except that: two edge surfaces which (i) respectively belong to any two adjacent lenses among the plurality of lenses and (ii) face each other have respective steps each of which protrudes toward a side opposite to one of the two edge surfaces which one faces the each of the steps; and the plurality of lenses are joined to each other by applying an adhesive to a gap formed between the steps.

According to the arrangement above, in the camera module in accordance with one aspect of the present invention, the adhesive is applied to the gap formed by the steps provided on the edge surfaces, facing each other, of the any two adjacent lenses. Accordingly, the adhesive does not reach an outer circumferential surface of each of the plurality of lenses. As such, a diameter of the lens unit does not become longer than a diameter of each of the plurality of lenses by a length equal to a thickness of the adhesive. That is, the diameter of the lens unit which is unitized is substantially equal to the diameter of each of the plurality of lenses. In this way, a small-sized camera module can be provided.

Further, a camera module in accordance with Aspect 4 of the present invention can have an arrangement identical to that of Aspect 2 except that the camera module further includes a spacer provided between two adjacent lenses among the plurality of lenses, the spacer having respective two edge surfaces, each of the two edge surfaces having a step which protrudes toward a side opposite to one of the two adjacent lenses corresponding to the spacer which one faces the each of the two edge surfaces, the spacer and each of the two adjacent lenses corresponding to the spacer being joined to each other by applying an adhesive to a gap formed between (i) the step provided on the each of the two edge surfaces of the spacer and (ii) the step provided on the edge surface of the one of the two adjacent lenses which one faces the each of the two edge surfaces of the spacer.

Conventionally, in order to adjust a distance between lenses, the lenses are formed by injection molding so as to have a shape that allows a desired distance to be achieved between the lenses. Formation of such a shape, however, involves difficulty. In view of this, the arrangement above makes it possible to adjust a distance between lenses by use of the spacer, without using lenses each having a shape that is difficult to form. Further, since the spacer and each of the adjacent two lenses are joined to each other by applying the adhesive to the gap formed by the step provided on the edge surface of the spacer and the step provided on the each of the adjacent two lenses, the spacer and the each of the adjacent two lenses are not easily separated from each other.

Further, a camera module in accordance with Aspect 5 of the present invention can have an arrangement identical to that of Aspect 3 or 4 except that the camera module further includes a light-shielding plate (19) provided between two adjacent lenses among the plurality of lenses, the light-shielding plate and each of the two adjacent lenses which correspond to the light-shielding plate being joined to each other by applying an adhesive to a gap formed between the light-shielding plate and the each of the two adjacent lenses corresponding to the light-shielding plate.

According to the arrangement above, the camera module can have a function of blocking stray light.

Further, a camera module in accordance with Aspect 6 of the present invention can have an arrangement identical to that of any one of Aspects 3 through 5 except that the camera module further includes a light-shielding plate (19) provided between two adjacent lenses among the plurality of lenses, one of the two adjacent lenses which correspond to the light-shielding plate having a protrusion on the edge surface of the one of the two adjacent lenses, the light-shielding plate being engaged with the edge surface of the other of the two adjacent lenses by being disposed on top of the protrusion.

According to the arrangement above, a light-shielding plate having a function of blocking stray light can be provided in the camera module without use of an adhesive.

Further, a camera module in accordance with Aspect 7 of the present invention can have an arrangement identical to that of any one of Aspects 3 through 6 except that: the edge surface of one of any two adjacent lenses among the plurality of lenses has a protruding shape; the edge surface of the other of the any two adjacent lenses has a recessed shape; and an optical axis of the lens unit is aligned by causing the protruding shape and the recessed shape to be engaged with or fitted into each other.

According to the arrangement above, it is possible to cause optical axes of the respective plurality of lenses to be aligned with each other by solely using the protruding shape and the recessed shape provided on the edge surfaces of the plurality of lenses.

Further, a camera module in accordance with Aspect 8 of the present invention can have an arrangement identical to that of any one of Aspects 3 through 6 except that an optical axis of the lens unit is aligned by causing outer wall surfaces of the respective plurality of lenses to be aligned with each other.

According to the arrangement above, it is not necessary to provide the protruding shape and the recessed shape on the edge surfaces of the plurality of lenses, as compared with a case in which alignment of an optical axis is carried out by causing the plurality of lenses to be engaged with or fitted into each other by making use of the protruding shape and the recessed shape provided on the edge surfaces of the plurality of lenses. This allows the edge surface of each of the plurality of lenses to be reduced by a size equal to those of the protruding shape and the recessed shape. This allows a diameter of each of the plurality of lenses. Accordingly, a lens unit having a smaller lens unit can be obtained.

Further, a camera module in accordance with Aspect 9 of the present invention can have an arrangement identical to that of Aspect 1 except that: two edge surfaces which (i) respectively belong to any two adjacent lenses among the plurality of lenses and (ii) face each other have respective steps each of which protrudes toward a side opposite to one of the two edge surfaces which one faces the each of the steps; the plurality of lenses are joined to each other by applying an adhesive to a gap formed between the steps; the camera module further comprises a spacer (21) provided between two adjacent lenses among the plurality of lenses, the spacer having respective two edge surfaces, each of the two edge surfaces having a step which protrudes toward a side opposite to one of the two adjacent lenses corresponding to the spacer which one faces the each of the two edge surfaces, the spacer and each of the two adjacent lenses corresponding to the spacer being joined to each other by applying an adhesive to a gap formed between (i) the step provided on the each of the two edge surfaces of the spacer and (ii) the step provided on the edge surface of the one of the two adjacent lenses which one faces the each of the two edge surfaces of the spacer; the edge surface of one of any two adjacent lenses among the plurality of lenses has a protruding shape; the edge surface of the other of the any two adjacent lenses has a recessed shape; and an optical axis of the lens unit is aligned by causing the protruding shape and the recessed shape to be engaged with or fitted into each other.

Conventionally, in order to adjust a distance between lenses, the lenses are formed by injection molding so as to have a shape that allows a desired distance to be achieved between the lenses. Formation of such a shape, however, involves difficulty. In view of this, the arrangement above makes it possible to adjust a distance between lenses by use of the spacer, without using lenses each having a shape that is difficult to form. Further, since the spacer and each of the adjacent two lenses are joined to each other by applying the adhesive to the gap formed by the step provided on the edge surface of the spacer and the step provided on the each of the adjacent two lenses, the spacer and the each of the adjacent two lenses are not easily separated from each other.

Further, according to the arrangement above, it is not necessary to provide the protruding shape and the recessed shape on the edge surfaces of the plurality of lenses, as compared with a case in which alignment of an optical axis is carried out by causing the plurality of lenses to be engaged with or fitted into each other by making use of the protruding shape and the recessed shape provided on the edge surfaces of the plurality of lenses. This allows the edge surface of each of the plurality of lenses to be reduced by a size equal to those of the protruding shape and the recessed shape. This allows a diameter of each of the plurality of lenses. Accordingly, a lens unit having a smaller lens unit can be obtained.

Further, a camera module (25) in accordance with Aspect 10 of the present invention is a camera module including: a lens unit (1) constituted by a plurality of lenses which are stacked on top of each other; and an actuator (30) for driving the lens unit, the plurality of lenses which constitute the lens unit being fixed to each other by being fitted into each other, the actuator having an opening (26) for incorporating the lens unit in an optical axis direction, the lens unit being incorporated into the actuator through the opening and held inside the actuator so as to face directly an inner wall surface of the actuator.

Further, a method, in accordance with Aspect 11 of the present invention, of manufacturing a camera module (25) is a method of manufacturing a camera module, the camera module including: a lens unit (1) constituted by a plurality of lenses which are stacked on top of each other; and an actuator (30) for driving the lens unit, the method comprising the steps of: preparing the actuator having an opening (26) for incorporating the lens unit in an optical axis direction; manufacturing the lens unit by causing the plurality of lenses to be fixed to each other by causing the plurality of lenses to be fitted into each other; and (i) incorporating the lens unit into the actuator through the opening of the actuator prepared and (ii) holding the lens unit inside the actuator so that the lens unit directly faces an inner wall surface of the actuator.

According to the arrangement above, the plurality of lenses can be unitized by causing the plurality of lenses to be fixed to each other by causing the plurality of lenses to be fitted into each other. This allows the unitized lens unit to be contained directly in the actuator and, accordingly, allows the camera module to have a diameter which is reduced by a length equal to a thickness of the lens barrel.

Further, in the camera module in accordance with one aspect of the present invention, the lens unit can be incorporated through the opening of the actuator after the actuator is assembled. Accordingly, deterioration of an optical performance of each of the plurality of lenses can be suppressed, so that a defective-product ratio among completed camera modules can be maintained low. Further, since it is possible to evaluate an optical performance of the lens unit alone before incorporating the lens unit into the actuator, a good lens unit whose optical performance is guaranteed can be incorporated in a good actuator. Accordingly, a defective-product ratio among assembled camera modules can be maintained low.

Therefore, according to one aspect of the present invention, it is possible to provide a camera module which has both a small size and a good quality.

Further, a camera module in accordance with Aspect 12 of the present invention can have an arrangement identical to that of any one of Aspects 3 through 10 except that the camera module further includes: a substrate; an image pickup device provided on the substrate; and a sensor cover for covering the image pickup device, the sensor cover including a portion which abuts against the image pickup device, the actuator abutting against the sensor cover.

According to the arrangement above, a position of the lens unit relative to the image pickup device can be determined with precision. Further, causing the lens carrier to abut against the sensor cover makes it possible to (i) reduce the number of parts interposed between the lens unit and the image pickup device and (ii), accordingly, suppress an influence of part tolerance variations.

Further, a camera module in accordance with Aspect of the present invention can have an arrangement identical to that of any one of Aspects 1, 3 through 10, and 12 except that: the actuator is constituted by a base member (4) and an upper cover (5) provided on the base member and having the opening; and the lens unit is supported by a suspension wire (27), which is attached to the base member inside the actuator and around which a camera shake compensation coil (28) is fixed, so as to have a distance from the lens unit.

According to the arrangement above, the actuator in accordance with one aspect of the present invention can be applied to an automatic focus actuator equipped with an OIS.

Further, an electronic device in accordance with Aspect 14 of the present invention is an electronic device in which the camera module in accordance with any one of Aspects 1, 3 through 10, 12, and 13 is incorporated.

According to the arrangement, it is possible to provide an electronic device including a camera module which has both a small size and a good quality.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be used in the field of camera module. In particular, the present invention can be applied suitably to a camera module mounted in various electronic devices including a communication device such as a mobile phone, and to the electronic devices.

REFERENCE SIGNS LIST

1: LENS UNIT
1a: FIRST LENS
1b: SECOND LENS
1c: THIRD LENS
1d: FOURTH LENS
2: LENS CARRIER
3: DRIVE COIL
4: BASE MEMBER
5: UPPER COVER
6: MAGNET
7: YOKE
8: UPPER LEAF SPRING
9: LOWER LEAF SPRING
10: SENSOR COVER
11: IRC FILTER
12: IMAGE PICKUP DEVICE
13: SUBSTRATE
14: STOPPER
15 through 18: EDGE SECTION
15a through 18a: UPPER EDGE SURFACE
15b through 18b: LOWER EDGE SURFACE
19: LIGHT-SHIELDING PLATE
20: ADHESIVE
21: SPACER 22: JIG
23: STAGE
24: STOPPER SECTION
25: CAMERA MODULE
25': CAMERA MODULE
26: OPENING
27: SUSPENSION WIRE
28: CAMERA SHAKE COMPENSATION COIL
30: ACTUATOR
30': ACTUATOR
31: MAGNET HOLDER

The invention claimed is:

1. A camera module comprising:
a lens unit comprising a plurality of lenses which are stacked on top of each other; and
an actuator configured to drive the lens unit,
the plurality of lenses which comprise the lens unit being fixed to each other with use of an adhesive applied between the plurality of lenses,
the actuator comprising an opening for incorporating the lens unit in an optical axis direction,
the lens unit being incorporated into the actuator through the opening and held inside the actuator so as to face directly an inner wall surface of the actuator,
the camera module further comprising a stopper with an L shape for fixing the lens unit within the actuator,
at least a part of the stopper being fitted into a gap between the lens unit and the inner wall surface, and
the lens unit being configured such that:
only a part of an edge surface of a lens positioned furthest from the opening contacts the inner wall surface of the actuator,
a remaining part of the edge surface of the lens positioned furthest from the opening does not contact the inner wall surface of the actuator, and
no other lens(es) in the actuator are in contact with the inner wall surface of the actuator.

2. The camera module as set forth in claim 1, wherein:
two edge surfaces which (i) respectively belong to any two adjacent lenses among the plurality of lenses and (ii) face each other comprise respective steps each of which protrudes toward a side opposite to one of the two edge surfaces which one faces the each of the steps; and
the plurality of lenses are joined to each other by applying an adhesive to a gap formed between the steps.

3. A camera module as set forth in claim 2, further comprising:
a spacer provided between two adjacent lenses among the plurality of lenses,
the spacer comprising respective two edge surfaces, each of the two edge surfaces comprising a step which protrudes toward a side opposite to one of the two adjacent lenses corresponding to the spacer which one faces the each of the two edge surfaces,
the spacer and each of the two adjacent lenses corresponding to the spacer being joined to each other by applying an adhesive to a gap formed between (i) the step provided on the each of the two edge surfaces of the spacer and (ii) the step provided on the edge surface of the one of the two adjacent lenses which one faces the each of the two edge surfaces of the spacer.

4. A camera module as set forth in claim 2, further comprising a light-shielding plate provided between two adjacent lenses among the plurality of lenses,
the light-shielding plate and each of the two adjacent lenses which correspond to the light-shielding plate being joined to each other by applying an adhesive to a gap formed between the light-shielding plate and the each of the two adjacent lenses corresponding to the light-shielding plate.

5. A camera module as set forth in claim 2, further comprising a light-shielding plate provided between two adjacent lenses among the plurality of lenses,
one of the two adjacent lenses which correspond to the light-shielding plate comprising a protrusion on the edge surface of the one of the two adjacent lenses,
the light-shielding plate being engaged with the edge surface of the other of the two adjacent lenses by being disposed on top of the protrusion.

6. The camera module as set forth in claim 2, wherein:
the edge surface of one of any two adjacent lenses among the plurality of lenses has a protruding shape;
the edge surface of the other of the any two adjacent lenses has a recessed shape; and
an optical axis of the lens unit is aligned by causing the protruding shape and the recessed shape to be engaged with or fitted into each other.

7. The camera module as set forth in claim 2, wherein an optical axis of the lens unit is aligned by causing outer wall surfaces of the respective plurality of lenses to be aligned with each other.

8. The camera module as set forth in claim 1, wherein:
two edge surfaces which (i) respectively belong to any two adjacent lenses among the plurality of lenses and (ii) face each other comprise respective steps each of which protrudes toward a side opposite to one of the two edge surfaces which one faces the each of the steps;
the plurality of lenses are joined to each other by applying an adhesive to a gap formed between the steps;
the camera module further comprises a spacer provided between two adjacent lenses among the plurality of lenses,
the spacer comprising respective two edge surfaces, each of the two edge surfaces comprising a step which protrudes toward a side opposite to one of the two adjacent lenses corresponding to the spacer which one faces the each of the two edge surfaces,
the spacer and each of the two adjacent lenses corresponding to the spacer being joined to each other by applying an adhesive to a gap formed between (i) the step provided on the each of the two edge surfaces of the spacer and (ii) the step provided on the edge surface of the one of the two adjacent lenses which one faces the each of the two edge surfaces of the spacer;
the edge surface of one of any two adjacent lenses among the plurality of lenses has a protruding shape;
the edge surface of the other of the any two adjacent lenses has a recessed shape; and
an optical axis of the lens unit is aligned by causing the protruding shape and the recessed shape to be engaged with or fitted into each other.

9. The camera module as set forth in claim 1, further comprising:
a substrate;
an image pickup device provided on the substrate; and
a sensor cover configured to cover the image pickup device,
the sensor cover including a portion which abuts against the image pickup device,
the actuator abutting against the sensor cover.

10. The camera module as set forth in claim 1, wherein:
the actuator comprises a base member and an upper cover provided on the base member and comprises the opening; and
the lens unit is supported by a suspension wire, which is attached to the base member inside the actuator and around which a camera shake compensation coil is fixed, so as to have a distance from the lens unit.

11. A camera module comprising:
a lens unit comprising a plurality of lenses which are stacked on top of each other; and
an actuator configured to drive the lens unit,
the plurality of lenses which constitute the lens unit being fixed to each other by being fitted into each other,
the actuator comprising an opening for incorporating the lens unit in an optical axis direction,
the lens unit being incorporated into the actuator through the opening and held inside the actuator so as to face directly an inner wall surface of the actuator
the camera module further comprising a stopper with an L shape for fixing the lens unit within the actuator,
at least a part of the stopper being fitted into a gap between the lens unit and the inner wall surface, and
the lens unit being configured such that:
   only a part of an edge surface of a lens positioned furthest from the opening contacts the inner wall surface of the actuator,
   a remaining part of the edge surface of the lens positioned furthest from the opening does not contact the inner wall surface of the actuator; and
   no other lens(es) in the actuator are in contact with the inner wall surface of the actuator.

12. An electronic device in which a camera module recited in claim 1 is incorporated.

13. A method of manufacturing a camera module,
the camera module including:
   a lens unit comprising a plurality of lenses which are stacked on top of each other;
   an actuator configured to drive the lens unit; and
   a stopper,
the method comprising:
   preparing the actuator comprising an opening for incorporating the lens unit in an optical axis direction;
   manufacturing the lens unit by causing the plurality of lenses to be fixed to each other by applying an adhesive between the plurality of lenses; and
   (i) incorporating the lens unit into the actuator through the opening of the actuator prepared and (ii) holding the lens unit inside the actuator so that the lens unit directly faces an inner wall surface of the actuator,
wherein the stopper has an L shape for fixing the lens unit within the actuator,
at least a part of the stopper being into a gap fitted between the lens unit and the inner wall surface, and
the lens unit being configured such that:
   only a part of an edge surface of a lens positioned furthest from the opening contacts the inner wall surface of the actuator,
   a remaining part of the edge surface of the lens positioned furthest from the opening does not contact the inner wall surface of the actuator, and
   no other lens(es) in the actuator are in contact with the inner wall surface of the actuator.

* * * * *